United States Patent Office 3,012,987
Patented Dec. 12, 1961

3,012,987
COATING COMPOSITION COMPRISING A BLEND OF POLYURETHANE REACTION PRODUCTS
Gerald Richard Ansul, Philadelphia, Pa., assignor to E. I. du Pont de Nemours and Company, Wilmington, Del., a corporation of Delaware
No Drawing. Filed Apr. 8, 1957, Ser. No. 651,183
2 Claims. (Cl. 260—45.4)

This invention relates to a coating composition and more particularly to a stable, curable coating composition comprising a blend in inert solvent of two polyurethanes.

Many coating compositions containing polyurethanes as their principal film-forming constituents have been made. These compositions have been particularly useful because they have had one or more excellent properties such as, for example, chemical inertness, high tensile strength, flexibility, extensibility and adhesion to a wide variety of substrates such as wood, metal and masonry.

Known compositions containing polyurethanes have lacked stability and have not had reproducible properties. Many known compositions must be provided in two separate portions which are mixed immediately before use, for, if the completely formulated composition is allowed to stand for a short time, it increases in viscosity and becomes unusable. Furthermore, with many known compositions, particularly those formed from a multiplicity of different polyol and isocyanate reactants, it is difficult to predict before the compositions are applied and cured what their properties will be after they are applied and cured. In addition, many of the known complex polyurethane compositions have such a high viscosity that they must be greatly diluted with solvent before they can be applied, thus increasing the cost of coating substrates with such compositions.

I have discovered a coating composition which has excellent stability, a relatively low viscosity at a high polymer concentration, and which can be easily and conveniently formulated to give cured coatings having a wide range of excellent, reproducible properties. This coating composition is readily cured by drying at normal atmospheric conditions.

The coating composition of this invention comprises a stable curable blend in inert solvent of (A) the polyurethane reaction product of (1) one hydroxyl equivalent of polyol selected from the group consisting of polyalkylene ether glycols and polyesters, the polyol having a molecular weight of about from 400 to 3,000, an acid number of less than about 5 and about 2 to 3 free hydroxyl groups per molecule, and (2) about from 0 to 2 hydroxyl equivalents of polyol consisting of aliphatic diol having 2 to 8 carbon atoms with (3) about 1.2 to 2.0 isocyanate equivalents of organic diisocyanate for each hydroxyl equivalent of polyol and (B) the polyurethane reaction product of (1) one hydroxyl equivalent of aliphatic polyol having at least about 3 hydroxyl groups per molecule with (2) 1.5 to 2 isocyanate equivalents of organic diisocyanate. The polyurethane components (A) and (B) are mixed in proportions such that the mole ratio of chemically combined polyol present in component (A) to that present in component (B) is about from 6:1 to 1:12, and preferably 1:1 to 1:4. Hydroxyl equivalent as used herein refers to the amount of polyol which contains one equivalent weight, that is, 17 parts by weight, of hydroxyl groups. Correspondingly, isocyanate equivalent refers to that amount of organic diisocyanate which contains one equivalent weight, 42 parts by weight, of isocyanate groups.

Polyurethane component (A) is prepared by reacting one hydroxyl equivalent of at least one polyol selected from the group consisting of polyalkyleneether glycols and polyesters with about 1.2 to 2.0 and preferably 1.5 to 2.0 isocyanate equivalents of organic diisocyanate. Up to 2 hydroxyl equivalents of aliphatic diol having 2 to 8 carbon atoms per molecule can also be added to the reaction mixture to increase the toughness of the resulting cured films; however, for most applications this is not necessary. If the aliphatic diol is added to the mixture, about from 1.2 to 2.0 and preferably 1.5 to 2.0 additional isocyanate equivalents of organic diisocyanate are added to the mixture for each hydroxyl equivalent of aliphatic diol. Alternatively, the aliphatic diol may be reacted separately with the diisocyanate, then added either to the finished blend or to polyurethane component (A).

If a large amount of diisocyanate is used, that is about 2.0 isocyanate equivalents for each hydroxyl equivalent, the polyurethane component (A) consists mostly of relatively short chain molecules consisting typically of one glycol or polyester molecule linked to two isocyanate molecules. If less isocyanate is used, that is about 1.2 isocyanate equivalents for each hydroxyl equivalent, the product contains mostly linear polyurethanes consisting, for example, of 4 glycol or polyester molecules linked to 5 molecules of diisocyanate through urethane linkages.

The reactants for polyurethane component (A) are mixed in the aforementioned proportions, then held under substantially anhydrous conditions at about from 50 to 130° C. for about from 8 to 1 hours. Preferably, the reactants are held at 80° to 120° C. for about 5 to 2 hours. The reaction can be carried out in inert solvent, but, since the reactants and polyurethane product formed therefrom in the case of component (A) are fairly fluid, it is not essential to carry out the reaction in solution. Suitable solvents for polyurethane component (A), component (B) and for blends thereof include inert polar solvents such as, for example, ketones, ethers, esters, and mixtures thereof, such as acetone, methyl ethyl ketone, methyl isobutyl ketone, Cellosolve acetate, amyl acetate, and butyl acetate. Small portions, usually less than about 35% by weight, of aromatic solvents such as, for example, benzene, toluene and xylene can also be added to the solvent mixture. Solvents having a boiling point below about 175° C. are preferred.

The polyalkylene ether glycols or polyesters used in polyurethane component (A) are characterized by having a number average molecular weight of about from 400 to 3000 and preferably 800 to 2000, an acid number of less than 5 and an average of 2 to 3 hydroxyl groups per molecule. The acid number is the number of milligrams of potassium hydroxide necessary to neutralize the acidity of one gram of polyester. Since the polyalkyleneether glycols have no free carboxyl groups, they have an acid number of zero.

Both substituted and unsubstituted polyalkyleneether glycols can be used in polyurethane component (A). Polyethyleneether glycol, polypropyleneether glycol, polytetramethyleneether glycol, polyhexamethyleneether glycol, polyoctamethyleneether glycol, polynonomethyleneether glycol, polydecamethyleneether glycol and mixtures thereof are typical unsubstituted polyalkyleneether glycols. Illustrative substituted polyalkyleneether glycols are those obtained by the condensation of styrene oxide, epichlorohydrin, 1,2-butylene oxide and 2,3-butylene oxide. Polyalkyleneether glycols containing several different radicals in the molecular chain, such as the compound

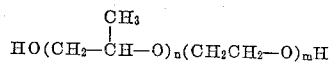

where $m$ and $n$ are integers greater than 1, can also be used.

Any polyester having an average molecular weight of about from 400 to 3000 and preferably 800 to 2000, an acid number of less than about 5 and an average of about from 2 to 3 free hydroxyl groups per molecule can be used in polyurethane component (A). These polyesters are prepared by standard procedures which include heating polyol and dicarboxylic acid components with or without a temperature of less than about 200° C. and preferably 160° to 190° C. until the desired acid number and molecular weight are reached. The molecular weight of the polyesters can conveniently be determined by the conventional boiling-point elevation, freezing point depression or acetylation methods.

One preferred type of polyester is the hydroxyl-terminated linear polyesters formed by the condensation of at least one glycol with at least one dicarboxylic acid. These polyesters are hydroxyl terminated by reacting the dicarboxylic acid with excess glycol or by well known methods of ester interchange. Alkyd resins formed by the condensation of dicarboxylic acids and polyols at least some of which have greater than 2 hydroxyl groups per molecule can also be used alone or in combination with the hydroxyl-terminated linear polyesters. The polyester or polyester mixture which is used, however, must have an acid number of less than 5 and an average of about 2 to 3 free hydroxyl groups per molecule. Such alkyd resins can be, but preferably are not oil modified.

Typical dicarboxylic acids from which the polyesters can be prepared include for example, phthalic, isophthalic, terephthalic, succinic, adipic, sebacic, azelaic, maleic, citric, and camphoric acids and anhydrides thereof. Dimer acids prepared by polymerizing unsaturated fatty acids, such as linoleic, linolenic, oleic and palmitoleic acids, which occur naturally in glyceride oils, can also be used. Polyols which can be condensed with the aforementioned dicarboxylic acids include, for example, ethylene glycol, propylene glycol, tetramethylene glycol, pentamethylene glycol, hexamethylene glycol, pinacol, glycerol, pentaerythritol, 1,1,1-trimethylolpropane, 1,1,1-trimethylolethane, mannitol, sorbitol, diethylene glycol, triethylene glycol and mixtures thereof.

Typical aliphatic diols which have 2 to 8 carbon atoms per molecule and can be used in polyurethane component (A) together with the polyalkyleneether glycols or polyesters include, for example, ethylene glycol, tetramethylene glycol, pentamethylene glycol, diethylene glycol, hexamethylene glycol and 2-ethylhexane-1,3-diol.

Aromatic, aliphatic or cycloaliphatic diisocyanates or combinations thereof can be reacted with the aforementioned polyols to yield polyurethane component (A). Such diisocyanates include, for example, 2,4-tolylene diisocyanate, 2,6-tolylene diisocyanate, 1,3-phenylene diisocyanate, methylene bis-(4-phenyl isocyanate), 4-chloro-1,3-phenylene diisocyanate, 1,5-naphthalene diisocyanate, 4,4'-biphenylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexyl isocyanate) and 1,5-tetrahydronaphthalene diisocyanate. Arylene diisocyanates, that is, those in which the isocyanate groups are attached to the aromatic ring, are preferred. In general, they react more rapidly than do the alkylene diisocyanates.

Polyurethane component (B) of the coating composition is prepared by mixing one hydroxyl equivalent of at least one aliphatic polyol having at least 3 hydroxyl groups per molecule with about from 1.5 to 2.0 and preferably 1.6 to 2.0 isocyanate equivalents of at least one of the aforementioned organic diisocyanates, then holding the substantially anhydrous reaction mixture at 50° to 130° C. and preferably 80° to 120° C. for about from 8 to 1 and preferably 5 to 2 hours. If 2.0 isocyanate equivalents of diisocyanate are added for each hydroxyl equivalent of polyol, the resulting product consists essentially of molecules having 3 or more diisocyanate molecules linked to one polyol molecule. If proportionately less diisocyanate is used, the resulting product contains cross-linked polyurethanes such as, for example, the cross-linked, isocyanate terminated, reaction product of 3 moles of triol with 7 moles of diisocyanate. Since polyurethane component (B) is a viscous liquid or hard, solid resin, it is most convenient to carry out this reaction in inert solvent. Solutions containing up to 80% and preferably 50% to 75% by weight of polyurethane are usually used.

Representative polyols which are used to make polyurethane component (B) include, for example, glycerol, 1,1,1-trimethylolpropane, 1,1,1-trimethylolethane, hexane-1,2,6-triol, castor oil, and pentaerythritol.

After polyurethane components (A) and (B) have been prepared, they are mixed in proportions such that the mole ratio of chemically combined polyol present in component (A) to that present in component (B) is about from 6:1 to 1:12 and preferably 1:1 to 1:4. By varying the proportion of each component within these limits, the properties of the resulting composition can be tailored to meet different applications. The elasticity, flexibility and abrasion resistance of the applied and cured composition increase with the amount of polyurethane component (A) (the component formed with polyalkyleneether glycol or polyester) which is added to the composition. The tensile strength, hardness and chemical resistance of the resulting coating composition increase with the proportion of polyurethane component (B) in the mixture.

Substantially anhydrous pigments, dyes, lakes and toners can also be added to the polyurethane composition of this invention as is conventional in the coating art.

Each of the aforementioned polyurethane components is shelf-stable indefinitely if it is stored under substantially anhydrous conditions. Mixtures of the components are also stable. Therefore, stable mixtures of the components can be prepared and used or the components can be prepared, then mixed prior to use in the proportions necessary to give the properties desired for the particular application. This gives the composition of this invention a wide range of applications and makes it particularly useful since the components can be easily mixed in proportions such that the cured coatings have properties which meet each particular application problem and show no viscosity increase after mixing.

The polyurethane components (A) and (B) can be prepared more reproducibly and more easily than can many other known polyurethane coating compositions. Also, the reaction of the polyol and diisocyanate in each component is driven essentially to completion so that little or no free diisocyanate is left in the reaction mixture. This reduces the toxicity of the resulting material.

The coating compositions of this invention can be applied by any of the conventional fluid coating techniques such as, for example, spray, dip, brush, knife and roller coating. The compositions are usually diluted with one or more of the aforementioned solvents, coated onto the substrate, then dried and cured at room or elevated temperature. During the curing, water in the atmosphere reacts with and crosslinks the terminal or pendant isocyanate groups on the polyurethane components and forms a continuous film. If the coating composition is air dried at room temperature, it becomes tack-free in from 4 to 6 hours and has final film properties in from 7 to 10 days. The curing time can be accelerated by placing the coated substrate in a steam oven for several hours or by heating the coated article at about 350 to 400° F. for a short time.

The composition of this invention can be used, for example, as a wood varnish on floors, furniture, bowling alleys and bowling pins; as an aircraft coating; or an adhesive for sandpaper. The cured coating composition is strong, flexible, abrasion resistant and chemically inert.

The following examples are intended to illustrate the invention and not to limit it in any way. Parts are by weight unless otherwise specified.

Example I

A polyurethane was prepared by reacting 402 parts (0.8 hydroxy equivalent) of polytetramethyleneether glycol having a molecular weight of 1006 with 139 parts (1.6 isocyanate equivalents) of 2,4-tolylene diisocyanate in 232 parts of methyl isobutyl ketone at a temperature of about 80° C. for 3 hours. The resulting product had a Gardner-Holdt viscosity of A–2. This product was then diluted to 50% solids by the addition of 310 parts of diisobutyl ketone to produce polyurethane component (A).

Polyurethane component (B) was prepared by reacting 107 parts (2.4 hydroxyl equivalents) of 1,1,1-trimethylolpropane with 418 parts (4.8 isocyanate equivalents) of 2,4-tolylene diisocyanate in 226 parts of methyl isobutyl ketone. The resulting polyurethane solution contained 70% solids and had a Gardner-Holdt viscosity of V.

A coating composition was prepared by mixing 81.5 parts of polyurethane component (A) with 28.2 parts of component (B) to give a solution containing 55% solids and having a Gardner-Holdt viscosity of B.

In the composition, the mole ratio of chemically combined diol in polyurethane component (A) to the chemically combined triol in polyurethane component (B) was about 1:1. This composition showed no change in viscosity after standing in a sealed container for several months.

The coating composition described above was brushed onto a wooden panel and air dried for about 3 days, then a second coating was applied to the panel and air dried. The total thickness of the dried polyurethane coating composition was about 2 mils. The dried coating composition showed excellent solvent, soap and alkali resistance. When the coating composition of this example was used as a floor varnish it showed excellent abrasion resistance and did not collect dirt. The dried coating composition had a Knoop hardness number of 3.6 as measured on a standard Tukon hardness tester. The Knoop and Pfund hardness numbers mentioned in this and the following examples are standard measures of the hardness of coatings. The hardness numbers, which are determined from the impression made in a coating by a loaded indenter, increase with the hardness of the coating.

Example II

A coating composition was prepared by mixing 130.2 parts of the polyurethane component (A) shown in Example I with 22.7 parts of the polyurethane component (B) shown in that example. The mole ratio of chemically combined diol in polyurethane component (A) to the chemically combined triol in polyurethane component (B) was about 2:1. This coating composition, when applied to a wooden panel and dried, was slightly softer, more flexible and had slightly better abrasion resistance than the coating composition shown in Example I. A dried film of the composition of this example had a Knoop hardness number of 1.0.

Example III

Polyurethane component (A) was prepared by heating 120 parts of polyethyleneether glycol having a molecular weight of 600 with 69 parts of 2,4-tolylene diisocyanate under a nitrogen blanket at a temperature of 80° C. for 3 hours. This component showed no appreciable change in viscosity after being stored 19 months in a closed container.

Polyurethane component (B) was prepared by reacting 30 parts of 1,1,1-trimethylolethane with 131 parts of 2,4-tolylene diisocyanate in 161 parts of methyl isobutyl ketone under a nitrogen blanket at a temperature of 80° C. for 3 hours.

A coating composition was prepared by mixing 9.5 parts of polyurethane component (A) with 21.4 parts of polyurethane component (B) and 13.8 parts of methyl isobutyl ketone. The mole ratio of chemically combined diol in polyurethane component (A) to the chemically combined triol in polyurethane component B was about 1:1.5. This composition had excellent stability.

The coating composition of this example was applied to a glass panel and air dried for about 65 hours at a relative humidity of 10%. The resulting partially dried film had a Pfund hardness number of about 3.

Example IV

Polyurethane component (A) was prepared by reacting 695 parts of polytetramethylene ether glycol having a molecular weight of 1000 with 244 parts of a diisocyanate mixture containing 80% by weight of 2,4-tolylene diisocyanate and 20% by weight of 2,6-tolylene diisocyanate at about 90° C. for 3 hours. The product, which contained no solvent, had a viscosity of 1700 poises at 25° C. and showed no increase in viscosity after being stored for 14 months.

Polyurethane component (B) was prepared by heating 54 parts (1.2 hydroxyl equivalents) of 1,1,1-trimethylolpropane with 162 parts (1.8 isocyanate equivalents) of 2,4-tolylene diisocyanate in 216 parts of methyl isobutyl ketone under substantially anhydrous conditions at 80° C. for 3 hours. The resulting product had a viscosity of 0.5 poise at 25° C., and showed no increase in viscosity after being stored for 14 months.

A coating composition was prepared by mixing 26 parts of polyurethane component (A) with 81 parts of polyurethane component (B) and 26 parts of xylene. The mole ratio of chemically combined diol present in component (A) to chemically combined triol present in component (B) was about 1:4. The product had a viscosity of 0.5 poise at 25° C. and after 14 months storage showed no change in viscosity.

The coating composition of this example was applied to glass and steel panels with a doctor blade, then air-dried for 18 hours at 25° C. and 50% relative humidity. The resulting coatings which were about 2 mils thick had a Knoop hardness number of 4.9. Eleven days later, after the coatings had air-cured completely, their Knoop hardness number had increased to 13.7. In addition to an extremely rapid rate of cure, the coatings of this example had excellent flexibility and impact resistance.

If 350 parts of methylene bis-(4-phenyl isocyanate) are substituted for the tolylene diisocyanate used in preparing component (A) and 29 parts of the product thus formed are mixed with 81 parts of component (B) and 26 parts of xylene as described above, the resulting coating composition has properties similar to the composition of this example. Also, 63 parts of tetramethylene glycol and 122 more parts of tolylene diisocyanate can be added to the reaction mixture in preparing component (A) thereby increasing the toughness of both component (A) and coating compositions made therefrom.

Example V

A coating composition was prepared by mixing 26 parts of the polyurethane component (A) and 65 parts of the polyurethane component (B) shown in Example IV with 26 parts of xylene. The mole ratio of chemically combined diol present in component (A) to the chemically combined triol in component (B) was about 1:3. A cured coating of this stable composition had a Knoop hardness number of 10.4, a tensile strength at break of 7650 lbs./sq. in., and an elongation at break of 11%.

Example VI

A polyester was formed by condensing diethylene glycol, adipic acid and 1,1,1-trimethylolpropane in a 13:13:1 mole ratio, respectively, to yield a polyester having a molecular weight of about 2000 and an acid number of 1.0. Polyurethane component (A) was prepared by mixing 500 parts of the aforementioned polyester with 109 parts of a 80/20 weight percent mixture of 2,4-tolylene diisocyanate and 2,6-tolylene diisocyanate in 203 parts of toluene, then heating the resulting mixture for 3 hours at 80° C. under substantially anhydrous conditions.

Polyurethane component (B) was prepared by reacting 134 parts of 1,1,1-trimethylolpropane with 435 parts of the tolylene diisocyanate mixture described above in 342 parts of xylene and 228 parts of methyl isobutyl ketone under substantially anhydrous conditions at 80° C. for 2 hours. The resulting product which contained 50% solids had a viscosity of about 2.3 poises at 25° C.

A coating composition was prepared by mixing 10 parts of component (A) with 10 parts of component (B) and diluting the resulting mixture to a solids concentration of 35% by weight with Cellosolve acetate. The mole ratio of chemically combined polyol present in component (A) to that present in component (B) was about 1:3. An air-dried coating of this composition on a glass panel had a Pfund hardness number of 12.

*Example VII*

Polyurethane component (A) was prepared by heating 200 parts of a linear polyester with 26 parts of the tolylene diisocyanate mixture shown in Example IV in 25 parts of toluene under substantially anhydrous conditions for 3 hours at 80° C. The linear polyester was the reaction product of 7.28 moles of adipic acid, 5.44 moles of azelaic and 7.77 moles of 1,4-butane diol and 5.95 moles of 1,5-pentane diol; it had a molecular weight of about 2500 and an acid number of 3.15.

A coating composition was prepared by mixing 10 parts of component (A) with 15 parts of a component (B) similar to that shown in Example VI, then diluting the resulting mixture to 35% by weight of solids with Cellosolve acetate. In the composition, the mole ratio of chemically combined polyol present in component (A) to that present in component (B) was about 1:4. A coat of this composition which had been applied to a glass panel and cured had a Pfund hardness number of 11.

*Example VIII*

Polyurethane component (A) was prepared by heating 1025 parts of polypropylene ether glycol having a molecular weight of 1025 with 234 parts of the tolylene diisocyanate mixture described in the preceding examples for 3 hours at 90° C. The resulting product had a viscosity of 300 poises at 25° C.

Polyurethane component (B) was prepared by heating a mixture of 134 parts of 1,1,1-trimethylolpropane, 522 parts of tolylene diisocyanate, 394 parts of xylene and 262 parts of methyl isobutyl ketone under substantially anhydrous conditions for 2 hours at 80° C.

A coating composition containing a 1:3 mole ratio of chemically combined diol in component (A) to triol in component (B) was prepared. This composition air-dried rapidly to yield a tough, flexible abrasion-resistant film.

*Example IX*

Polyurethane component (A) was prepared by reacting 296 parts of polytetramethyleneether glycol having a molecular weight of 2955 with 35 parts of 80/20 weight percent mixture of 2,4-tolylene diisocyanate and 2,6-tolylene diisocyanate in 142 parts of xylene at 100° C. for 3 hours. The resulting product had a viscosity of about 30 poises at 25° C. and showed no increase in viscosity after being stored for 13 months.

Polyurethane component (B) was prepared by heating 233 parts (0.75 hydroxyl equivalent) of purified castor oil with 131 parts of tolylene diisocyanate in 218 parts of xylene and 146 parts of methyl isobutyl ketone at 90° C. for 3 hours. The viscosity of the resulting product was about 0.41 poise at 25° C.

A stable, air-drying coating composition was prepared by mixing components (A) and (B) to yield a mixture which had equimolar amounts of chemically combined polyol in the two components.

*Example X*

Two hundred parts (0.245 hydroxy equivalent) of a polyester were heated with 33 parts of tolylene diisocyanate in 20 parts of xylene at 80 to 90° C. for 2½ hours to yield polyurethane component (A). The polyester used had an acid number of 2.56, contained about 2.5 hydroxyl groups per molecule and was the reaction product of 9 moles of dimer acid, 10 moles of diethylene glycol and 1 mole of 1,1,1-trimethylolethane. The dimer acid used for preparing the polyester was essentially a mixture of polymerized $C_{18}$ unsaturated fatty acids having an average of about 36 carbon atoms per polymer molecule and was sold by Emery Industries under the code name, Dimer Acid 3065–S.

Three coating compositions were prepared from the component (A) shown above and a component (B) similar to that shown in Example I. These compositions had the following properties.

| Composition | Moles of Combined polyol in Comp. A/Moles of Combined Polyol in Comp. B | Knoop Hardness Number |
| --- | --- | --- |
| 1 | 1:1.33 | 3.0 |
| 2 | 1:4 | 7.5 |
| 3 | 1:12 | 14.3 |

*Example XI*

Polyurethane component (B) was prepared by adding 54 parts of pentaerythritol dispersed in 166 parts of methyl ethyl ketone slowly over a period of about 3 hours to 27 parts of 2,4-tolylene diisocyanate in 83 parts of methyl ethyl ketone held at 98° C., then heating the resulting mixture at 98° C. for an additional 3 hours. This product can be mixed with the aforementioned polyurethane component (A) as described in the preceding examples to yield products comparable to those described hereinbefore.

I claim:

1. A stable, curable coating composition consisting essentially of a blend in inert solvent of (A) the polyurethane reaction product of (1) one hydroxyl equivalent of at least one polyol selected from the group consisting of polyalkylene ether glycols and polyesters having ester linkages as an integral part of the main polymer chain, said polyol having an average molecular weight of about from 400 to 3000, an acid number of less than about 5 and an average of about 2 to 3 free hydroxyl groups per molecule, and (2) about 2 hydroxyl equivalents of polyol consisting of saturated aliphatic diol having 2 to 8 carbon atoms with (3) about from 1.2 to 2.0 isocyanate equivalents of organic diisocyanate for each hydroxyl equivalent of polyol and (B) the polyurethane reaction product of (1) one hydroxyl equivalent of monomeric aliphatic polyol having at least 3 hydroxyl groups per molecule with (2) 1.5 to 2.0 isocyanate equivalents of organic diisocyanate, said chemically combined polyol in said component (A) and said chemically combined polyol in said component (B) being present in a mole ratio of about from 6:1 to 1:12.

2. A stable, curable coating composition consisting essentially of a blend in inert solvent of (A) the polyurethane reaction product of (1) one hydroxyl equivalent of at least one polyol selected from the group consisting of polyalkyleneether glycols and polyesters having ester linkages as an integral part of the main polymer chain, said polyol having an average molecular weight of about from 400 to 3000, an acid number of less than about 5 and an average of about 2 to 3 free hydroxyl groups per molecule, and (2) about 2 hydroxyl equivalents of polyol consisting of saturated aliphatic diol having 2 to 8 carbon atoms with (3) about from 1.5 to 2.0 isocyanate equivalents of organic diisocyanate for each hydroxyl equivalent of polyol and (B) the polyurethane reaction product of (1) one hydroxyl equivalent of monomeric aliphatic polyol having at least 3 hydroxyl groups per molecule with (2) about from 1.6 to 2.0 isocyanate equivalents of organic diisocyanate, said chemically combined polyol in said component (A) and said chemically combined polyol in said component (B) being present in a mole ratio of about from 6:1 to 1:12.

References Cited in the file of this patent

UNITED STATES PATENTS

| | | |
|---|---|---|
| 2,621,166 | Schmidt et al. | Dec. 9, 1952 |
| 2,764,565 | Hoppe et al. | Sept. 25, 1956 |
| 2,901,467 | Croco | Aug. 25, 1959 |

FOREIGN PATENTS

| | | |
|---|---|---|
| 733,624 | Great Britain | July 13, 1955 |
| 742,501 | Great Britain | Dec. 30, 1955 |
| 745,960 | Great Britain | Mar. 7, 1956 |
| 761,395 | Great Britain | Nov. 14, 1956 |